F. TYSON.
DASHER FOR ICE CREAM FREEZERS.
APPLICATION FILED SEPT. 20, 1906.

999,473.

Patented Aug. 1, 1911.

UNITED STATES PATENT OFFICE.

FRANK TYSON, OF CANTON, OHIO, ASSIGNOR TO THE TYSON COMPANY, OF CANTON, OHIO, A CORPORATION.

DASHER FOR ICE-CREAM FREEZERS.

999,473. Specification of Letters Patent. Patented Aug. 1, 1911.

Application filed September 20, 1906. Serial No. 335,408.

*To all whom it may concern:*

Be it known that I, FRANK TYSON, a citizen of the United States, residing in Canton, Ohio, have invented certain Improvements in Dashers for Ice-Cream Freezers, of which the following is a specification.

One object of my invention is to so construct a dasher for ice cream freezers as to insure the complete removal of the film of frozen cream from the can by the scraper with which said dasher is provided, as the dasher and the inner surface of the can move relatively to one another, a further object being to cause a rapid agitation or whipping of the central portion of the mass of cream, in order to increase the bulk of the frozen product. These objects I attain in the manner hereinafter set forth, reference being had to the accompanying drawing, in which—

Figure 1:
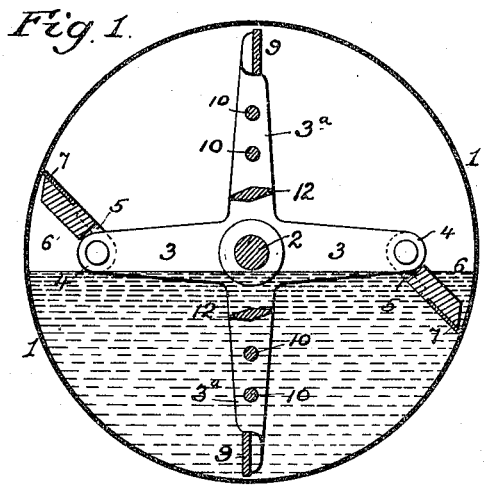
Figure 2:
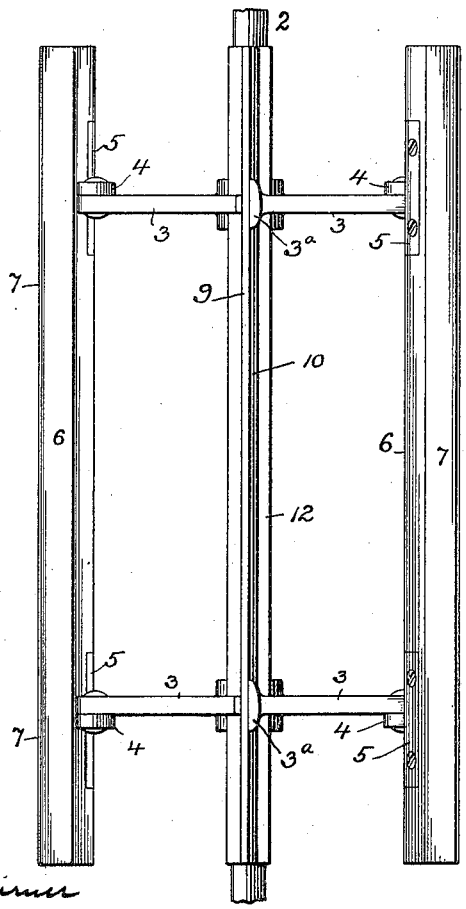

Figure 1 is a vertical section of sufficient of a horizontal ice cream freezer and its dasher to illustrate my invention, and Fig. 2 is a plan view of the dasher.

In the drawing 1 represents part of the freezing can, and 2 the central shaft which passes therethrough and carries the dasher, the latter consisting of a pair of frames or spiders, each having, in the present instance, a pair of scraper arms 3 and a pair of beater arms $3^a$.

The wooden scraper blades with which the dasher of an ordinary ice cream freezer is equipped will not effectively perform their intended duty in the modern high-speed power freezer in which the cream in contact with the inner wall of the can is rapidly frozen because of the low temperature of said can produced by the rapid circulation of brine around the same. The scraping edge of an ordinary wooden scraper does not fit so closely to the wall of the can as to remove all portions of the film of frozen cream from the metallic surface of the can, and such wooden scraper does not wear uniformly nor can it adapt itself to inequalities or irregularities in the surface of the can. In carrying out my invention, therefore, I provide the scraper with a relatively large body portion faced with a thin metallic blade which projects beyond said body portion, and thus constitutes the only portion of the scraper in contact with the inner surface of the can, the blade being pressed into close contact with said surface by reason of the natural tendency of the edge of the scraper to swing outwardly owing to the pressure of the cream thereon, this constant contact causing the blade to be kept sharp.

To the outer ends of the arms 3 are pivotally hung lugs 4, which project from plates 5 secured to the body portion 6 of the scraper, if the latter is composed of wood, or forming part of said body portion of the scraper if the same is of metal.

Secured to the face of the scraper body and projecting beyond the outer edge of the same is the scraper blade 7, which is relatively thin and is composed of non-corrosive metal, the outer edge of this blade constituting the sole point of contact between the scraper and the inner surface of the can, as shown in Fig. 1

Each of the arms $3^a$ of the dasher has a beater blade 9 secured to its outer end, and it also carries beater rods 10, and a whipping blade 12, the latter being nearer to the shaft 2 than are the beater rods, and being of diamond-shaped cross section with its longer axis slightly inclined to its path of motion in order that its forward edge shall be somewhat farther from the axis of rotation than its rear edge. The diamond shape of the blade causes it to pass easily through the mass of cream (the level of the original charge being indicated in Fig. 1) the intended purpose of this blade being to whip the central portion of the mass of cream by a lifting action, or a tendency to force this portion of the mass toward the central shaft, such action being due partly to the inclination of the blade and partly to the bevel of the inner surface of its advance portion, although either of these means may be relied upon in some cases. By thus whipping or beating up the central portion of the mass of cream, which, in an ordinary freezer, is free from direct agitation, I materially increase the bulk of the frozen product.

Although I have shown the dasher as equipped with a pair of scraper arms and a pair of beater arms, it may have but one of each, or more than two, as desired, or certain features of my invention may be be utilized in dashers equipped with scrapers only.

I claim:—

1. A dasher for ice cream freezers, said dasher having a freely swinging scraper provided with a thin metallic blade which projects beyond the forward edge of the body of the scraper whereby, when the dasher is in use, said thin projecting blade will be constantly pressed against the wall of the freezing can and will be kept sharp by reason of such contact.

2. A dasher for ice cream freezers, said dasher having projecting arms carrying a series of beaters disposed one beyond another in a radial direction, the inner beater presenting a beveled face toward the axis of rotation of the dasher, and the outer beaters having a different cross sectional form from the inner beater.

In testimony whereof, I have signed my name to this specification, in the presence of two subscribing witnesses.

FRANK TYSON.

Witnesses:
J. C. MILLER,
H. B. STEWART.

Copies of this patent may be obtained for five cents each, by addressing the "Commissioner of Patents, Washington, D. C."